INVENTOR.
CHARLES I. KEENE

Dec. 15, 1970     C. I. KEENE     3,547,556
HYDRAULICALLY DRIVEN WIND MACHINE
Filed Dec. 23, 1968     3 Sheets-Sheet 2
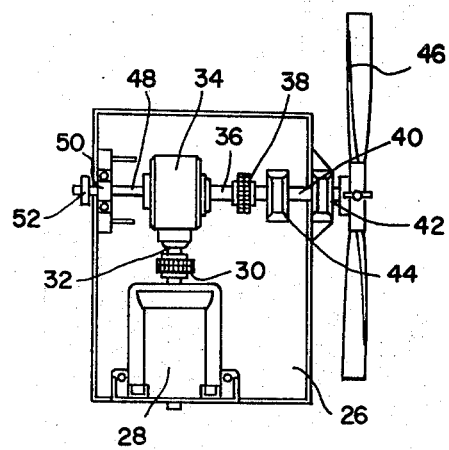
FIG. 2.
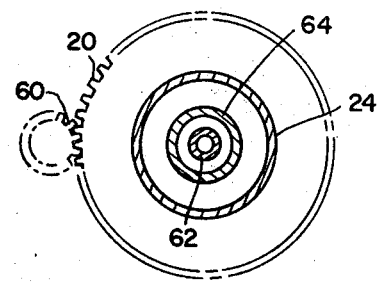
FIG. 3.
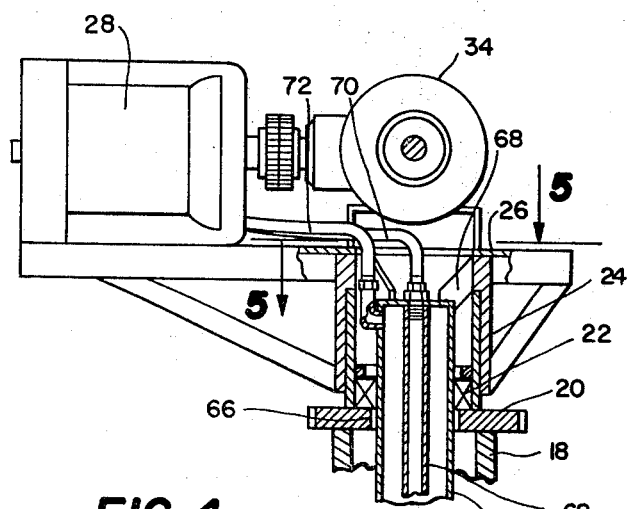
FIG. 4.
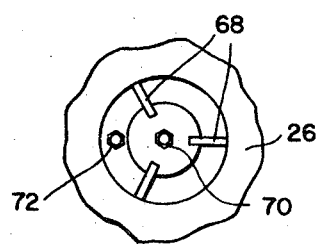
FIG. 5.
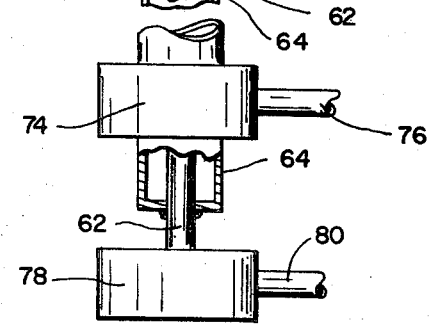
INVENTOR.
CHARLES I. KEENE
BY
*Wm. H. Dean*

United States Patent Office 3,547,556
Patented Dec. 15, 1970

3,547,556
HYDRAULICALLY DRIVEN WIND MACHINE
Charles I. Keene, Phoenix, Ariz., assignor to
Herman P. Smith, Holtville, Calif.
Filed Dec. 23, 1968, Ser. No. 786,045
Int. Cl. B64c 27/12
U.S. Cl. 416—110                            4 Claims

ABSTRACT OF THE DISCLOSURE

A hydraulically driven wind machine comprising a hollow stand having a platform rotatably mounted thereon; a hydraulic motor provided with a first gear box coupled to and driving an air impeller and a second gear box which is provided with a pinion engaging a ring gear stationarily mounted on said stand to rotate said platform about a substantially vertical axis, and a pair of concentric hollow tubular members provided with slip ring couplings for delivering fluid to and from said hydraulic motor and an engine driven pump communicating with said slip ring couplings.

BACKGROUND OF THE INVENTION

Various wind machines have been used to alleviate frost conditions in areas such as the citrus groves and other horticultural or agricultural areas by providing a substantial temperature inversion.

Wind machines have heretofore been driven in various ways by mechanical drive shafts and/or prime movers carried on platforms which are rotatably mounted on vertically disposed stands. Normally these stands are high enough so that the impeller is supported at a position or elevation comparable with tree tops of citrus groves or the like.

The weight of a prime mover on a rotating platform atop a stand is ponderous and requires heavy bearing structure, as well as the costly maintenance. Additionally, the power of delivering fuel to such an engine has been a substantial difficulty.

Other drive systems for impellers on the elevated stands have included various mechanical arrangements, and there have been some hydraulically driven wind machines, such as disclosed in the patent to A. J. Grabowski, No. 3,180,570, and A. R. Coles, No. 3,288,358.

While the machines disclosed in the foregoing patents are hydraulically operated, they are not equipped properly and efficiently to drive an impeller and also a rotary platform as may be required with respect to impeller speeds and platform rotational speeds when the general operation of hydraulic motors is considered with respect to varying ambient temperatures and other environmental conditions.

SUMMARY OF THE INVENTION

The present invention comprises a novel hydraulically driven wind machine having a vertical stand provided with a platform rotatably mounted thereon. The platform carrying a hydraulic motor with a first reduction gear box having two output shafts, one of which drives a stand rotating gear box, and the other of which drives an air impeller. The hydraulic motor having concentric conduits connected therewith and extending from the platform and engaged by rotary couplings which communicate with a hydraulic pump driven by a prime mover.

The present invention has many advantages in that the hydraulic motor may be operated at speeds compatible with varying oil viscosities at a great variety of ambient temperatures, and to provide proper output through the medium of a gear box which has a suitable gear ratio properly to drive the impeller of the machine, and a secondary gear box which has a ratio compatible with the rotary driving of the platform on the top of the stand of the invention.

Another object of the invention is to provide a wind machine having a novel hollow stand provided with hydraulic fluid reservoir therein, and also an internal combustion engine fuel cell adapted to hold a supply of fuel for diesel engine, or the like, which drives a hydraulic pump forming part of the invention.

Further objects and advantages of the invention may be apparent from the following specification, appended claims, and accompanying drawings:

BRIEF DESCRIPTION OF THE DRAWINGS

FIG. 2 is a top or plan view of the rotating platform of the invention;

FIG. 3 is a plan sectional view taken from the line 3—3 of FIG. 1, showing the platform drive gear of the invention on enlarged scale;

FIG. 4 is an enlarged fragmentary sectional view taken from the line 4—4 of FIG. 1, showing parts and portions in elevation to facilitate the illustration;

FIG. 5 is a plan sectional view taken from the line 5—5 of FIG. 4; and

DESCRIPTION OF THE PREFERRED EMBODIMENTS

Figure 1:
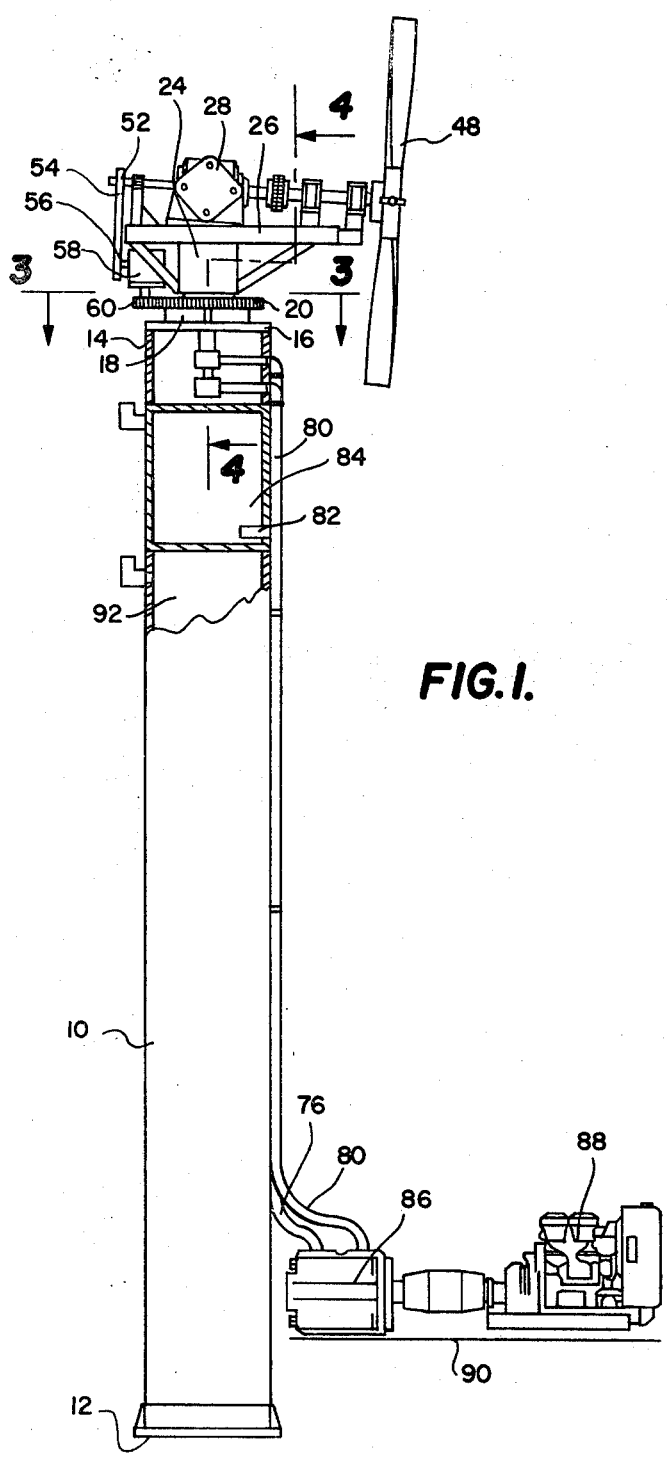
FIG. 1 is a side elevational view of a wind machine in accordance with the present invention, and showing portions thereof broken away and in section to amplify the illustration.

The wind machine of the invention, as shown in FIG. 1 of the drawings, is provided with a substantially vertically disposed stand 10 supported on the base plate 12 which is normally fixed to a concrete foundation, or the like. The stand 12 is a hollow tubular member preferably made of large steel pipe, and the normally upper end 14 of the stand 12 extends to an elevation which may be slightly higher than the usual tree tops of a citrus grove, or the like.

The upper end of the stand 14 is provided with a platform mounting plate 16 having an upstanding cylindrical portion 18 which, as shown in FIG. 4, carries a spur gear 20 which is fixed to the stand 10.

Bearing means 22 supports a hollow tubular housing 24 of a platform 26 which is thereby rotatably mounted on the stand 10. This platform 26 carries a hydraulic motor 28 having an output shaft adapted to drive a coupling 30 connected to an input shaft 32 of a gear box 34. This gear box 34 has a first output shaft 36 driving a coupling 38 connected to an impeller drive shaft 40 which is mounted in bearings 42 and 44 supported on the platform 26. A helical air impeller 46 is carried on the shaft 40 and is adapted to impel air for creating wind in the conventional manner.

The gear box 34 is provided with a second output shaft 48 journalled in a bearing 50 carried on the platform 26. An extending portion of the shaft 48 beyond the bearing 50 carries a pulley 52 engaged by a belt 54, as shown in FIG. 1 of the drawings. This belt 54 drives an input shaft 56 of a gear box 58 which is provided with an output shaft driving a pinion gear 60. This gear 60 meshes with the spur gear 20, and by torque reaction, is adapted to rotate the platform 26 about the central axis of the ring gear 20.

Fixed in the hollow tubular platform support structure 24 are a pair of concentric hydraulic conduits 62 and 64 which extend downwardly through a central opening 66 in the spur gear 20. These conduits 62 and 64 are supported by radially disposed brackets 68 which connect the conduits to the hollow tubular structure 24 which supports the platform 26.

A pair of hydraulic conduits 70 and 72 communicate with the interior of the conduits 62 and 64, respectively, and are coupled to the hydraulic motor to provide for the delivery of pressure fluid thereto and the relief of hydraulic fluid therefrom.

Connected to the hollow tubular conduit 64 is a rotary coupling 74 of conventional construction, and extending from this coupling 74 is a hydraulic conduit 76 which serves as a fluid delivery conduit, as will be hereinafter described.

Coupled to the conduit 62 is a hydraulic rotary coupling 78 connected to a fluid return conduit 80, as will be hereinafter described.

As shown in FIG. 1 of the drawings, the conduit 80 is provided with a lateral extension 82 which extends through the side wall of the hollow stand 10 and into a hydraulic fluid reservoir 84 therein. The conduit 80 extends as a return fluid conduit to a hydraulic pump 86 driven by a diesel engine 88 supported on a base 90 adapted to be supported on the ground.

The conduit 76 is coupled to the hydraulic pump 86 and adapted to receive fluid, under pressure, therefrom to be delivered through the rotary coupling 74 and conduit 64 and the conduit 72 to the hydraulic motor 28 for driving the same.

As shown in FIG. 1, the conduit 76 and the conduit 78 extend outwardly through the side wall of the hollow stand 10 from the couplings 74 and 78 so that the hollow stand may be compartmented to provide the hydraulic fluid reservoir 84 and a disel engine fuel cell 92 directly below the hydraulic fluid reservoir 84.

It will be seen that the reduction gear boxes 28 and 56 are adapted to provide drive means for the impeller and the rotary platform 26, and that the gear box 28 drives both the impeller and the gear box 58. These gear boxes in connection with the hydraulic motor 28 permit gear ratios compatible with the motor speeds required for driving the impeller and for transmitting proper horsepower under varying environmental conditions, such as great varieties of temperatures. Additionally, these gear boxes provide optional ratios, if desired, depending upon various requirements in the driving of the impeller 48 and the platform 26.

Figure 6:
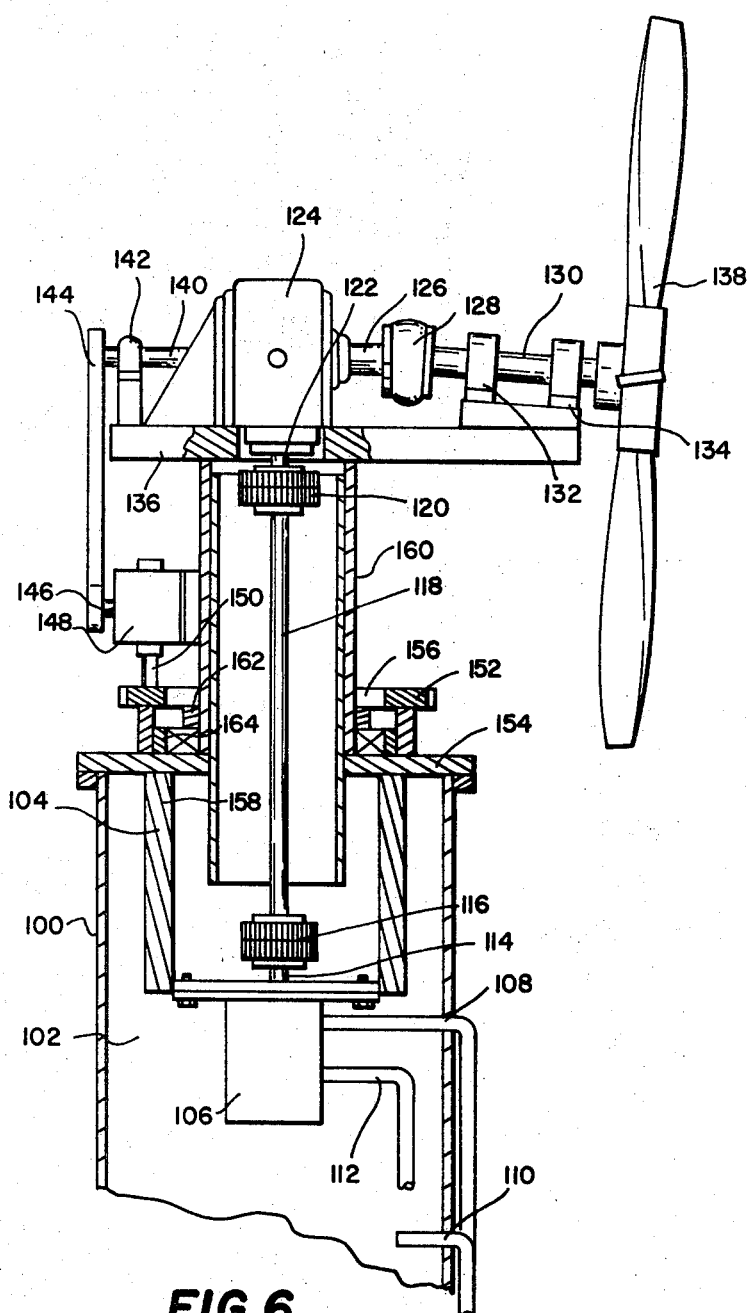
FIG. 6 is a view similar to FIG. 4, showing a modification of the invention.

The modification of the invention, as shown in FIG. 6, may be the preferred form of the invention in accordance with installation and/or environmental requirements.

This modification of the invention comprises a vertically disposed hollow stand 100 similar to the hollow stand 10. This stand 100 is provided with a hydraulic fluid reservoir 102 therein comparable to the reservoir 34, hereinbefore described.

Projecting into the reservoir 102 is a bracket 104 supporting a hydraulic motor 106 in the area of the reservoir 102. A hydraulic fluid pressure delivery conduit 108 is coupled to the pump 86, as hereinbefore described, and a return conduit 110 communicating with the interior of the reservoir 102 is also coupled to the hydraulic pump 86, as hereinbefore described.

An exhaust fluid conduit 112 is coupled to the hydraulic motor 106 and exhaust hydraulic fluid directly into the hydraulic reservoir 102.

The hydraulic motor 106 is provided with a vertically disposed shaft 114 connected by a flexible chain coupling 116 to a shaft 118 having a flexible chain coupling 120 at the opposite end thereof coupling the shaft 118 to an input shaft 122 of a gear box 124 similar to the gear box 34, hereinbefore described. The gear box 122 is provided with an output shaft 126 connected by a universal joint 128 to an impeller shaft 130 carried in bearings 132 and 134 mounted on a rotary platform 136 similar to the platform 26, hereinbefore described.

A wind impeller 138 is carried by the shaft 130 and rotatable thereby.

A second output shaft of the gear box 124 is designated 140 and is journalled in a pillow block 142 carried by the platform 136. A belt and pulley assembly 144 couples the shaft 140 with an input shaft 146 of a gear box 148 functioning similarly to the gear box 58, hereinbefore described.

The gear box 148 is provided with an output shaft 150 carrying a spur gear similar to the spur gear 60 and meshing with the ring gear 152, shown in FIG. 6, which is similar in function to the spur gear 20, shown in FIG. 3.

The gear 152 is fixed to a top plate 154 which is also fixed to the hollow stand 100.

The gear 152 is provided with a central opening 156 through which an upstanding hollow bearing structure 158 projects and which is fixed to the top 154 of the stand 100. This hollow cylindrical bearing member 158 is surrounded by a hollow cylindrical bearing member 160 fixed to the bottom of the platform 136 by welding, or otherwise, and a surrounding flange 162 carried on the perimeter of the hollow cylindrical member 160 rests on a thrust bearing 164 carried on the top 154 of the stand 100, and thus the hollow cylindrical member 160 is rotatably supported about the hollow cylindrical member 158 to permit rotation of the platform 136 about the axis of the shaft 118 as controlled by the reduction gear box 148 and the spur gear 152 similarly as hereinbefore described.

It will be seen that torque reaction from the hydraulic motor 106 may be imparted to the platform 136, and it is therefore desired that the platform rotate in response to the direction of torque reaction and that the shaft 150 of the gear box 148 be compatible with the direction of rotation of the platform so that torque reaction of the hydraulic motor 106 is not resisted and that efficient driving of the platform 136 may be attained at the proper speed, as controlled by the ratio of the gear box 148.

It will be seen that the modification, as shown in FIG. 6 of the drawings, alleviates the installation of the rotary couplings 74 and 78, shown in FIG. 4 of the drawings, but disposes the hydraulic motor within the area of the reservoir 102 so that the plate 154 and the platform 136 may be removed from the hollow stand 100 when it is desired to service the hydraulic motor 106.

Other construction may be apparent for the purpose of servicing the hydraulic motor 106 since the reservoir 102 may be located considerably below the hydraulic motor 106 and a side door may be placed in the hollow wall of the stand 100 to attain access to the motor 106, if desired.

It will be obvious to those skilled in the art that various modifications may be resorted to within the spirit of the present invention.

I claim:

1. In a wind machine, the combination of: a stand adapted to extend vertically above the ground; a platform rotatably mounted on an upper portion of said stand; a rotary air impeller rotatably mounted on said platform; a first shaft means carrying said impeller; bearing means on said platform mounting said first shaft means thereon; a first gear box having an output shaft means coupled to said first shaft means for driving the same; a second shaft means driven by said gear box; a second gear box means coupled to said second shaft means, said second gear box means carried by said platform and having a second output shaft means; a spur pinion coupled to said second output shaft means; a spur gear meshing with said pinion and stationarily fixed to said stand; a hydraulic motor coupled to and disposed to drive said first gear box; a pair of concentric hydraulic conduits coupled to said hydraulic motor and carried by said platform; first and second rotary couplings coupled to said concentric conduits; delivery and return conduits coupled respectively to said first and second rotary couplings; a hydraulic pump coupled to said delivery conduit for delivering hydraulic fluid, under pressure, to said hydraulic motor; and a stationary prime mover for driving said pump; and a base supporting said pump and said prime mover; said stand comprising a hollow structure having a hydraulic fluid reservoir therein; said prime mover comprising an internal combustion engine; a fuel engine compartment in said hollow stand structure and adapted to supply fuel to said internal combustion engine; said pump being provided with an inlet communicating with said return conduit and an outlet communicating with said delivery conduit; said delivery and return conduit extending from said first and second rotary couplings to the outside of said hollow stand structure near the upper end thereof; said conduit extending downwardly at said outside of said stand structure and coupled to said hydraulic pump, said return conduit having a conduit portion extending into said hollow stand structure and communicating with said fluid reservoir therein.

2. The invention, as defined in claim 1, wherein: said prime mover base is disposed and adapted to rest on the ground.

3. The invention, as defined in claim 1, wherein: said prime mover base is disposed and adapted to rest on the ground.

4. The invention, as defined in claim 1, wherein: said prime mover is a diesel engine.

References Cited
UNITED STATES PATENTS

| | | | |
|---|---|---|---|
| 3,180,570 | 4/1965 | Grabowski | 416—110 |
| 3,288,358 | 11/1966 | Coles | 416—110 |

EVERETTE A. POWELL, JR., Primary Examiner

U.S. Cl. X.R.

416—171